US010373604B2

United States Patent
Latorre-Martinez et al.

(10) Patent No.: US 10,373,604 B2
(45) Date of Patent: Aug. 6, 2019

(54) NOISE COMPENSATION IN SPEAKER-ADAPTIVE SYSTEMS

(71) Applicant: Kabushiki Kaisha Toshiba, Minato-ku (JP)

(72) Inventors: Javier Latorre-Martinez, Cambridge (GB); Vincent Ping Leung Wan, Cambridge (GB); Kayoko Yanagisawa, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 71 days.

(21) Appl. No.: 15/422,583

(22) Filed: Feb. 2, 2017

(65) Prior Publication Data

US 2017/0221479 A1    Aug. 3, 2017

(30) Foreign Application Priority Data

Feb. 2, 2016    (GB) .................................. 1601828.5

(51) Int. Cl.
| | | |
|---|---|---|
| *G10L 13/08* | (2013.01) | |
| *G10L 15/065* | (2013.01) | |
| *G10L 15/07* | (2013.01) | |
| *G10L 15/16* | (2006.01) | |
| *G10L 15/20* | (2006.01) | |

(Continued)

(52) U.S. Cl.
CPC .............. *G10L 13/08* (2013.01); *G10L 13/00* (2013.01); *G10L 15/065* (2013.01); *G10L 15/07* (2013.01);
(Continued)

(58) Field of Classification Search
CPC .............................. G10L 15/065; G10L 13/08
(Continued)

(56) References Cited

U.S. PATENT DOCUMENTS

| | | | |
|---|---|---|---|
| 6,446,038 B1 | 9/2002 | Bayya et al. | |
| 7,089,182 B2 * | 8/2006 | Souilmi ................ | G10L 15/063 704/233 |

(Continued)

FOREIGN PATENT DOCUMENTS

EP    1 536 414 A2    6/2005

OTHER PUBLICATIONS

Combined Search and Examination Report dated Jul. 19, 2016 in United Kingdom Patent Application No. 1601828.5.

*Primary Examiner* — Shaun Roberts
(74) *Attorney, Agent, or Firm* — Oblon, McClelland, Maier & Neustadt, L.L.P.

(57) ABSTRACT

An acoustic model is adapted, relating acoustic units to speech vectors. The acoustic model comprises a set of acoustic model parameters related to a given speech factor. The acoustic model parameters enable the acoustic model to output speech vectors with different values of the speech factor. The method comprises inputting a sample of speech which is corrupted by noise; determining values of the set of acoustic model parameters which enable the acoustic model to output speech with said first value of the speech factor; and employing said determined values of the set of speech factor parameters in said acoustic model. The acoustic model parameters are obtained by obtaining corrupted speech factor parameters using the sample of speech, and mapping the corrupted speech factor parameters to clean acoustic model parameters using noise characterization paramaters characterizing the noise.

15 Claims, 7 Drawing Sheets

(51) Int. Cl.
  *G10L 13/00* (2006.01)
  *G10L 13/047* (2013.01)
  *G10L 15/26* (2006.01)

(52) U.S. Cl.
  CPC ............ *G10L 15/075* (2013.01); *G10L 15/16* (2013.01); *G10L 15/20* (2013.01); *G10L 13/047* (2013.01); *G10L 15/265* (2013.01)

(58) Field of Classification Search
  USPC ................................ 704/244, 258, 260, 266
  See application file for complete search history.

(56) References Cited

U.S. PATENT DOCUMENTS

| | | | | |
|---|---|---|---|---|
| 8,738,376 B1* | 5/2014 | Goel | ........................ | G10L 15/14 704/205 |
| 2002/0072894 A1* | 6/2002 | Kompe | .................. | G10L 15/065 704/1 |
| 2003/0220791 A1* | 11/2003 | Toyama | .................. | G10L 15/07 704/256.3 |
| 2004/0204937 A1* | 10/2004 | Zhang | ..................... | G10L 15/20 704/233 |
| 2010/0076759 A1* | 3/2010 | Shinohara | ............. | G10L 15/144 704/233 |
| 2011/0238416 A1* | 9/2011 | Seltzer | .................... | G10L 15/20 704/233 |
| 2012/0130716 A1* | 5/2012 | Kim | ...................... | B25J 13/003 704/256.1 |
| 2013/0231929 A1* | 9/2013 | Komeji | .................. | G10L 15/20 704/233 |
| 2013/0262119 A1* | 10/2013 | Latorre-Martinez | ... | G10L 13/08 704/260 |
| 2016/0055846 A1* | 2/2016 | Jung | ....................... | G10L 15/20 704/233 |
| 2017/0040016 A1* | 2/2017 | Cui | ....................... | G10L 15/063 |

* cited by examiner

NOISE COMPENSATION IN SPEAKER-ADAPTIVE SYSTEMS

FIELD

The present disclosure relates to a system and method for adapting an acoustic model which relates acoustic units to speech vectors. The system and method may be employed in a text-to-speech system and method.

BACKGROUND

Text to speech systems are systems where audio speech or audio speech files are output in response to reception of a text file.

Voice cloning or customer voice building systems are systems which can synthesize speech with the voice of a given speaker with just a few samples of the voice of that speaker. Voice cloning systems are often combined with text to speech systems.

Text to speech systems and voice cloning systems are used in a wide variety of applications such as electronic games, E-book readers, E-mail readers, satellite navigation, automated telephone systems, automated warning systems.

There is a continuing need to make systems more robust to noise.

SUMMARY OF THE INVENTION

According to aspects of the present invention there are provided a method for adapting an acoustic model relating acoustic units to speech vectors according to claim 1, and an apparatus according to claim 13.

The method and apparatus can be employed respectively in a method of text to speech synthesis according to claim 9, and a text to speech apparatus according to claim 14.

BRIEF DESCRIPTION OF THE DRAWINGS

Systems and methods in accordance with non-limiting examples of the invention will now be described with reference to the accompanying figures in which.

DETAILED DESCRIPTION

Figure 1:
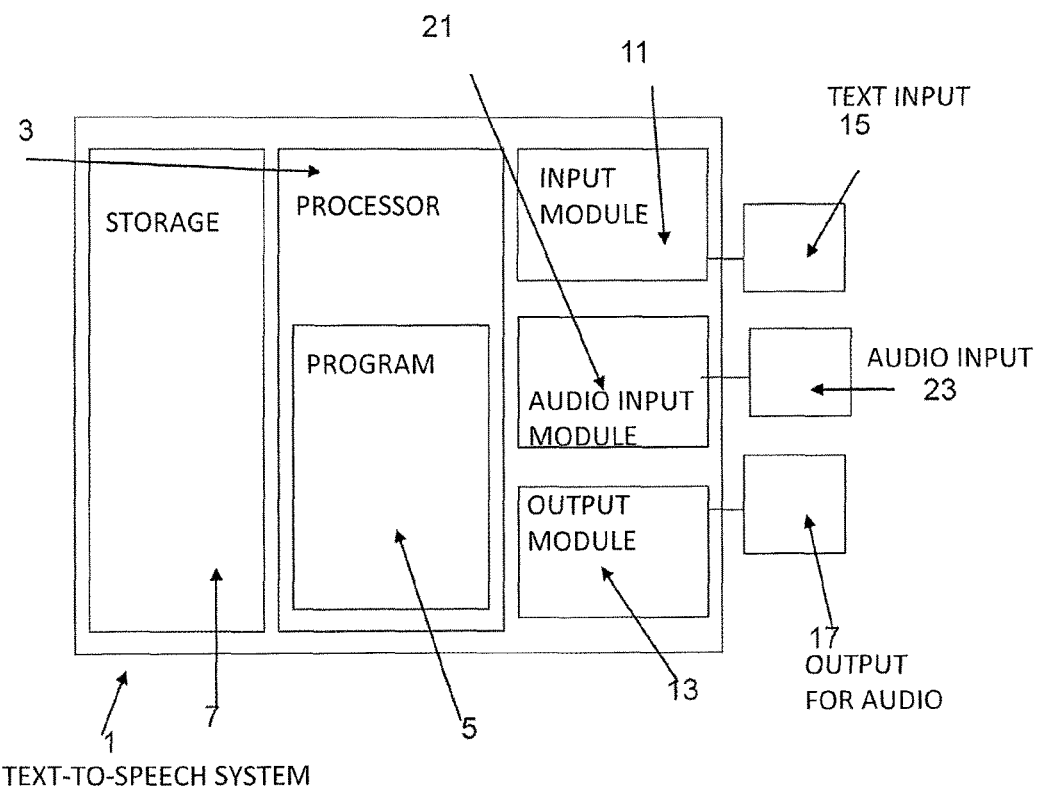
FIG. 1 shows a schematic of a text to speech system in accordance with an example of the invention.

FIG. 1 shows a text to speech system in accordance with an example of the invention of the present invention.

The text to speech system 1 comprises a processor 3 which executes a program 5. The program 5 comprises an acoustic model. The acoustic model will be described in more detail below. Text to speech system 1 further comprises storage 7. The storage 7 stores data which is used by program 5 to convert text to speech. The text to speech system 1 further comprises an input module 11 and an output module 13. The input module 11 is connected to a text input 15. Text input 15 receives text. The text input 15 may be for example a keyboard. Alternatively, text input 15 may be a means for receiving text data from an external storage medium or a network.

Connected to the output module 13 is an output for audio 17. The audio output 17 is used for outputting a speech signal converted from text which is input into text input 15. The audio output 17 may be for example a sound generation unit e.g. a speaker, or an output for an audio data file which may be sent to a storage medium, networked, etc.

The text to speech system 1 also comprises an audio input 23 (such as a microphone) and an audio input module 21. In an example of the invention, the output of the audio input module 21 when the audio input module 21 receives a certain input audio signal ("input audio") from the audio input 23, is used to adapt the speech output from the text to speech system. For example, the system may be configured to output speech with the same speaker voice as that of a sample of speech captured by the audio input 23.

In this example of the invention, the text to speech system 1 receives an audio sample through audio input module 21 and text through text input 15. The program 5 executes on processor 3 and converts the text into speech data using data stored in the storage 7 and the input audio sample. The speech is output via the output module 13 to audio output 17.

Figure 2:
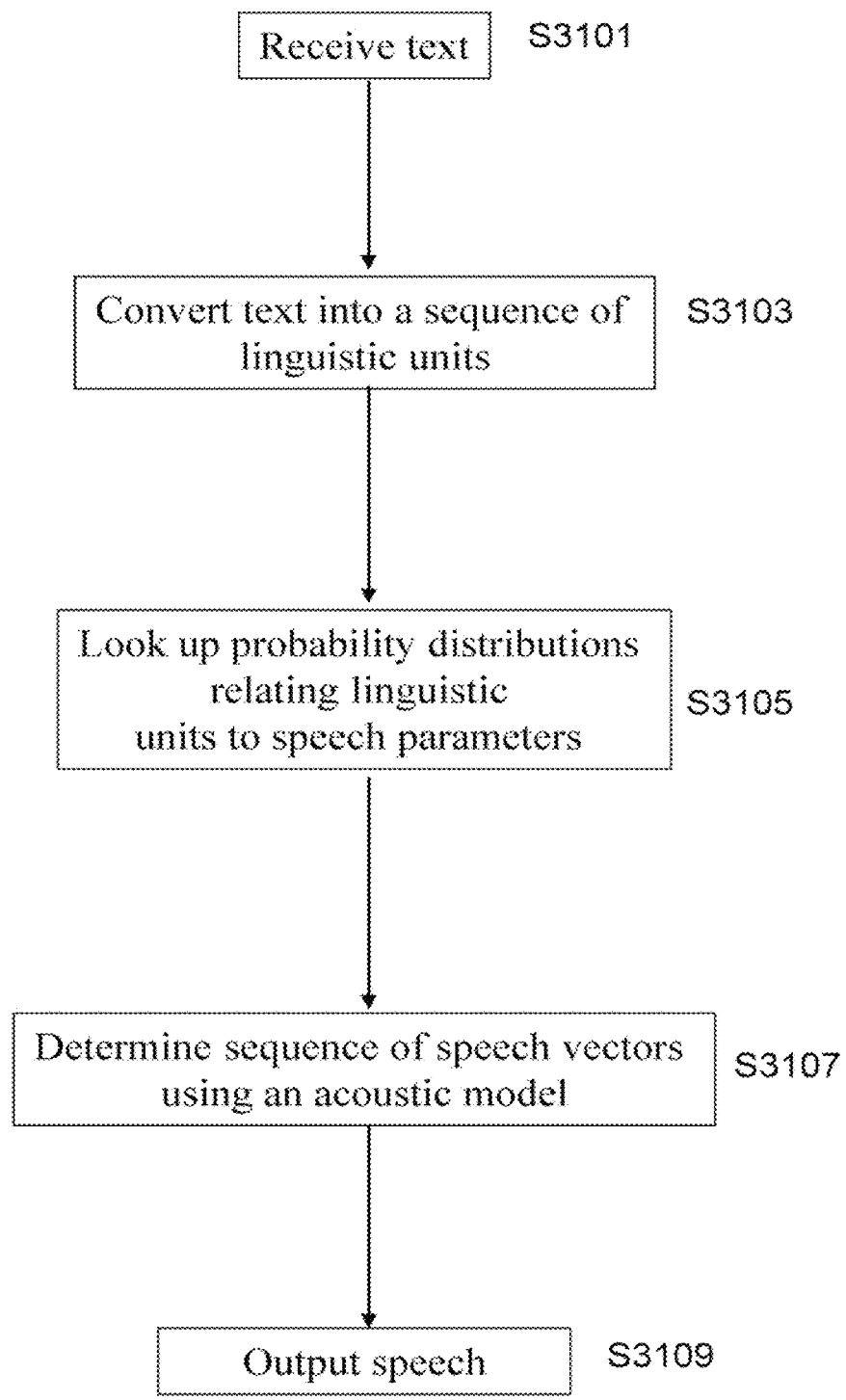
FIG. 2 is a flow diagram of a text to speech process in accordance with an example of the invention.

A simplified text to speech process will now be described with reference to FIG. 2.

In first step, S3101, text is input. The text may be input via a keyboard, touch screen, text predictor or the like. The text is then converted into a sequence of acoustic units in step S3103. These acoustic units may be phonemes or graphemes. The units may be context dependent e.g. triphones which take into account not only the phoneme which has been selected but the proceeding and following phonemes. The text is converted into the sequence of acoustic units using techniques which are well-known in the art and will not be explained further here.

In step S3105, the probability distributions are looked up which relate acoustic units to speech parameters. In this example of the invention, the probability distributions will be Gaussian distributions which are defined by means and variances. However, it is possible to use other distributions such as the Poisson, Student-t, Laplacian or Gamma distributions some of which are defined by variables other than the mean and variance.

It is impossible for each acoustic unit to have a definitive one-to-one correspondence to a speech vector or "observation" to use the terminology of the art. Many acoustic units are pronounced in a similar manner, are affected by surrounding acoustic units, their location in a word or sentence, or are pronounced differently by different speakers. Thus, each acoustic unit only has a probability of being related to a speech vector and text-to-speech systems calculate many probabilities and choose the most likely sequence of observations given a sequence of acoustic units.

Figure 3:
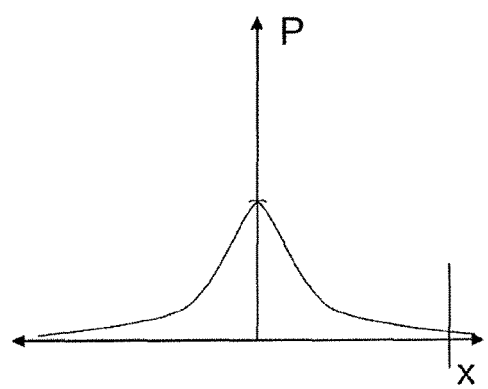
FIG. 3 shows a Gaussian function.

A Gaussian distribution is shown in FIG. 3. FIG. 3 can be thought of as being the probability distribution of an acoustic unit relating to a speech vector. For example, the speech vector shown as X has a probability P of corresponding to the phoneme or other acoustic unit which has the distribution shown in FIG. 3.

The shape and position of the Gaussian is defined by its mean and variance. These parameters are determined during the training of the system.

These parameters are then used in the acoustic model in step S3107. In this description, the acoustic model is a Hidden Markov Model (HMM) However, other models could also be used.

The memory of the text of the speech system will store many probability density functions relating an acoustic unit i.e. phoneme, grapheme, word or part thereof to speech parameters. As the Gaussian distribution is generally used, these are generally referred to as Gaussians or components.

In a Hidden Markov Model or other type of acoustic model, the probability of all potential speech vectors relating to a specific acoustic unit must be considered. Then the sequence of speech vectors which most likely corresponds to the sequence of acoustic units will be taken into account. This implies a global optimization over all the acoustic units of the sequence taking into account the way in which two units affect to each other. As a result, it is possible that the most likely speech vector for a specific acoustic unit is not the best speech vector when a sequence of acoustic units is considered.

In some examples of the invention, there will be a plurality of different states which will be each be modelled using a Gaussian. For example, in an example of the invention, the text-to-speech system comprises multiple streams. Such streams may be selected from one or more of spectral parameters (Spectrum), Log of fundamental frequency (Log $F_0$), first differential of Log $F_0$ (Delta Log $F_0$), second differential of Log $F_0$ (Delta-Delta Log $F_0$), Band aperiodicity parameters (BAP), duration etc. The streams may also be further divided into classes such as silence (sil), short pause (pau) and speech (spe) etc. In an example of the invention, the data from each of the streams and classes will be modelled using a HMM. The HMM may comprise different numbers of states. For example, in an example of the invention, 5 state HMMs may be used to model the data from some of the above streams and classes. A Gaussian component is determined for each HMM state.

Once a sequence of speech vectors has been determined, speech is output in step S3109.

As noted above, in an example of the invention, the parameters employed in step S3105 may be adapted according to input audio which is input in to the system via audio input module 21 of FIG. 1. This adaptation enables speech with the speaker voice (and/or the other speaker factor, as appropriate) of the input audio to be output from the text to speech system.

In an example of the invention, the acoustic model is one which is able to capture a range factors of speech data such as speaker, expression or some other factor of speech data. In a further example of the invention, the output speech comprises the same value of a speaker factor as that of the input audio sample, i.e. the text to speech system 1 adapts the acoustic model such that the output speech matches that of the audio sample.

For example, the output speech is output with the same speaker voice as the input speech.

In an example of the invention, the acoustic model is a Hidden Markov Model (HMM). However, other models could also be used. Hidden Markov Models and their training are described in Appendix 1. The modelling of speech factors such as speaker voice is explained in relation to three methods of training HMMs: Maximum Likelihood Linear Regression (MLLR), Cluster Adaptive Training (CAT) and Constrained Maximum Likelihood Linear Regression (CMLLR).

Although any speech factor, or multiple speech factors can be used as a basis for adapting the output speech of a text to speech system, in the below description, it is assumed that the speech factor is that of speaker voice.

Figure 4:
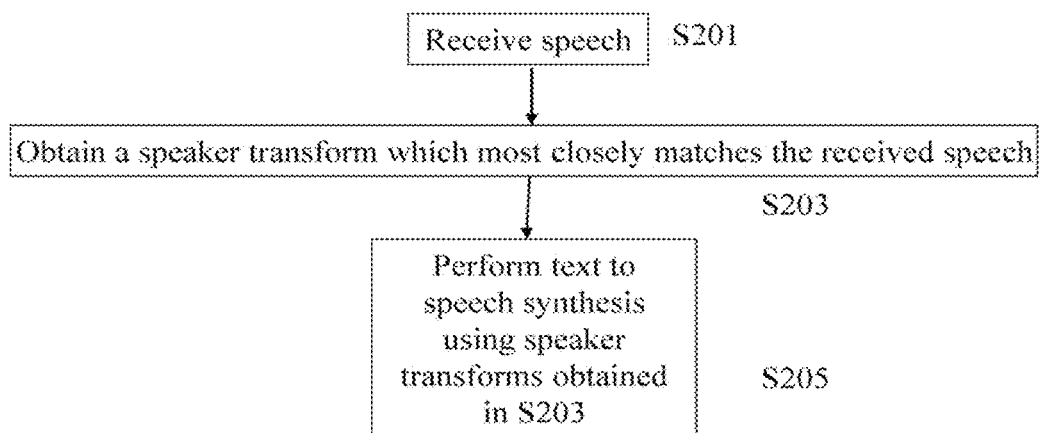
FIG. 4 is a flow diagram of acoustic model adaptation using clean speech.

FIG. 4 shows a flow chart of the process of adaptation of such models in response to input audio where the audio was recorded under "clean" conditions, i.e. the input audio is not corrupted by noise. In step S201, the input audio (input speech) is received. In Step S203, the speaker transforms of the acoustic model are modified until a set of speaker transforms which most closely matches the input speech is determined. The nature of the speaker transforms and the method employed to obtain the set of speaker transforms will depend on the nature of the acoustic model employed.

The training of three suitable acoustic models which capture speaker variation is described in Appendix 1. During training, an Auxiliary equation for each model (e.g. Equation (48) for MLLR) is minimised for each training speaker in order to obtain the corresponding speaker transform. In an example of the invention, during adaptation, the Auxiliary equation is minimized for the input adaptation data in order to obtain the speaker transform of the input speaker. Adaptation therefore comprises effectively retraining the acoustic model using the input data. If the exact context of the adaptation data is not found in the training data, decision trees are employed to find similar contexts within the training data instead.

In Step S205, text to speech synthesis is performed employing the speaker transforms calculated in step S203 according to the process described above in relation to FIG. 2. Thus, the speech of the input text is output with the same voice as that of the speech received in step S201.

The above method is suitable for adapting acoustic models and obtaining speech which matches speech received under clean conditions, i.e. when the speech sample was obtained in a controlled sound environment, such as in a studio using high quality equipment. However, the input audio sample may be corrupted with additive or convolutional noise. If the method of FIG. 4 were employed for a sample of speech obtained under noisy conditions, the speaker transform obtained during adaptation would be adapted to the corrupted speech and therefore itself be corrupted by noise. Consequently, the corresponding audio output would also be affected by the noise corrupting the original speech signal. Depending on the degree of noise corruption, the quality of match between the voice of the person to whom the speech sample belonged and the output audio may be poor. In an example of the invention, the system according to FIG. 1 is configured to compensate for the noise in the input signal and therefore the output speech is substantially unaffected by the degree of noise corruption that the input audio sample is subjected to.

The effect of noise on a speech signal can be modelled as follows. In an example of the invention, it is assumed that a speech signal $s(\tau)$ is corrupted by an additive noise signal $n(\tau)$ and a convolutional channel noise $h(\tau)$. The observed signal $s_o(\tau)$ will be $$s_o(\tau) = (s(\tau) + n(\tau)) * h(\tau) \qquad (1)$$

Ignoring the effect of the window, the spectrum of this signal for frequency $\omega$ on a frame around time $\tau$ will be $$S_O(\omega) = [S(\omega) + N(\omega)]H(\omega) \qquad (2)$$

Note that to simplify the notation, τ has been omitted from the above equation. The power spectrum for the frame is $$|S_O(\omega)|^2 = |S(\omega)+N(\omega)|^2|H(\omega)|^2 \quad (3)$$

and the logarithm of the amplitude becomes $$\log(|S_O(\omega)|) = 0.5 \log(|S(\omega)+N(\omega)|^2) + \log(|H(\omega)|). \quad (4)$$

$|S(\omega)+N(\omega)|^2$ can be expanded as $$|S(\omega)+N(\omega)|^2 = |S(\omega)|^2 + |N(\omega)|^2 + 2|S(\omega)||N(\omega)|\cos(\theta_S(\omega) - \theta_N(\omega)), \quad (5)$$

wherein θ represents the phase. The first term on the right hand side of Equation (4) can be shown to be $$\log(|S(\omega) + N(\omega)|^2) = \quad (6)$$
$$2\log(|S(\omega)|) + \log\left(1 + 2\frac{|N(\omega)|}{|S(\omega)|}\cos(\theta_S(\omega) - \theta_N(\omega)) + \frac{|N(\omega)|^2}{|S(\omega)|^2}\right).$$

In an example of the invention, the speech signal is represented as a Cepstrum, which is a Discrete Cosine Transform (DCT) of the log-spectrum. Equivalently, the DCT of the log-spectrum is a linear transformation of the log spectral vectors given by Equation (4). In other words, $$c_o(\tau) = Tl_{a_o}(\tau) \quad (7)$$

where T is the DCT transformation matrix and $$l_{s_o}(T) = \begin{bmatrix} \log(|S_o(\omega_0)|) \\ \vdots \\ \log(|S_o(\omega_f)|) \end{bmatrix} \quad (8)$$

where $f$ is the frequency index.

From Equations (4) and (6) it follows that $$l_{s_o}(T) = l_s(T) + l_h(T) + 0.5l_{n/s}(T) \quad (9)$$

where $$l_s(T) = \begin{bmatrix} \log(|S(\omega_0)|) \\ \vdots \\ \log(|S(\omega_f)|) \end{bmatrix}, \quad (10)$$

$$l_h(T) = \begin{bmatrix} \log(|H(\omega_0)|) \\ \vdots \\ \log(|H(\omega_f)|) \end{bmatrix} \quad (11)$$

and $$l_{n/s}(T) = \begin{bmatrix} \log(1 + 2\rho(\omega_0)\cos(\Delta\theta(\omega_0)) + \rho(\omega_0)^2) \\ \vdots \\ \log(1 + 2\rho(\omega_f)\cos(\Delta\theta(\omega_f)) + \rho(\omega_f)^2) \end{bmatrix} \quad (12)$$

with $$\rho(\omega) = \frac{|N(\omega)|}{|S(\omega)|} \quad (13)$$

and $$\Delta\theta(\omega) = \theta_S(\omega) - \theta_N(\omega). \quad (14)$$

Therefore it follows that $$c_o = T(l_s + l_h + 0.5l_{n/s}) = c_n + c_h + 0.5c_{n/s} \quad (15)$$

where $$c_s = Tl_s \quad (16)$$

$$c_h = Tl_h \quad (17)$$

$$c_{n/a} = Tl_{n/s} \quad (18)$$

The Taylor series logarithmic expansion is given by $$\log(x) = \sum_{i=1}^{\infty} \frac{(-1)^{i+1}}{i}(x-1)^i \quad (19)$$
$$= (x-1) - \frac{(x-1)^2}{2} + \frac{(x-1)^3}{3} - \ldots$$

for |x−1|≤1 which is a reasonable assumption as long as the signal-to-noise ratio (SNR) is positive. Therefore, each element of $l_{n/s}$ becomes $$l_{n/s}[\omega] = \sum_{i=1}^{\infty} \frac{(-1)^{i+1}}{i}(2\rho(\omega)\cos(\Delta\theta(\omega)) + \rho(\omega)^2)^i \quad (20)$$

which depends in a non-linear way on both the speech signal and the additive noise. Obtaining a clean speaker transform from a speaker transform determined under noisy conditions is therefore non-trivial.

When adapting an acoustic model to produce speech corresponding to a speaker to which an audio input corresponds, the goal is to transform a canonical model so that it can generate speech with the characteristics of the target speaker. When employing clean speech, the adaptation parameters model the differences between the speakers. However, when the adaptation data is noisy, instead of just modelling the difference between speakers, they must also adjust for the contribution of $c_{n/s}$ and $C_h$ terms as given in Equation (15). In addition, the precise effect that the noise has depends on the form of the canonical model employed.

The effect of noise on the adaptation parameters for MLLR, CAT and CMLLR is discussed in detail in Appendix 2. The approach of the present example, however, may be applied to whatever type of acoustic model is employed in the system as will now be explained.

Figure 5:
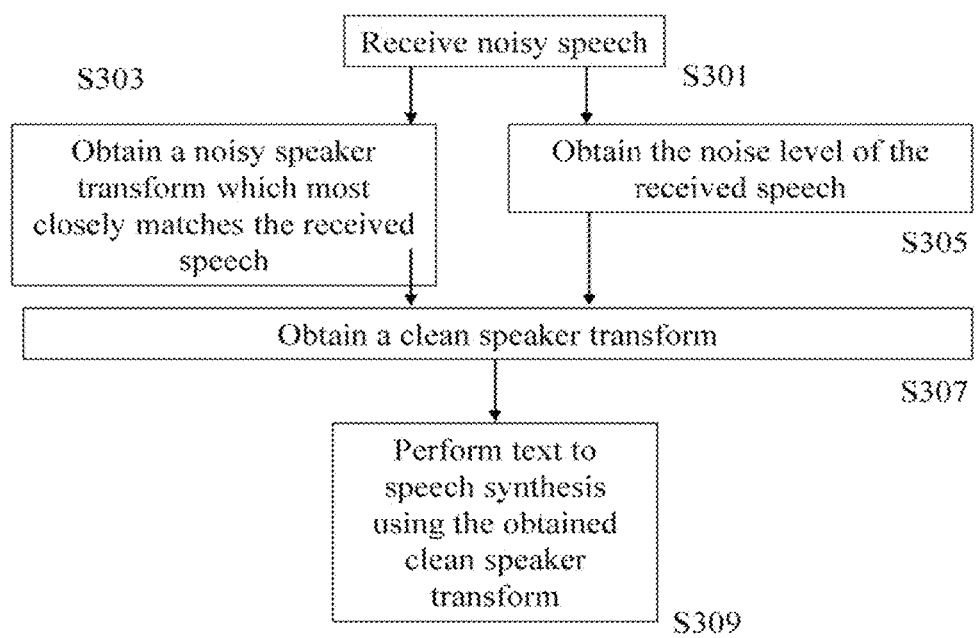
FIG. 5 is a flow diagram of acoustic model adaptation using noisy speech.

FIG. 5 shows a flow chart of a process according to an example of the invention in which an acoustic model is adapted to speech obtained in a noisy environment and compensation of the noise is then performed. In Step S301, speech is received. In Step S303, the speaker transforms of the acoustic model are modified until a set of speaker transforms which most closely matches the input speech is determined. This process is entirely equivalent to that of S203 in FIG. 4.

In Step S305 features relating to the characteristics of the noise are determined from the input speech. This gives a noise characterization defined by one or more noise parameters. A variety of noise features may be used to calculate the characteristics of noise in the speech sample. Examples include the average spectrum and mel-cepstrum of non-speech segments of the sample or the ratio of noise to speech. In another example of the invention, a segment (e.g. of several seconds) of audio without speech are input and the analyser calculates the noise parameters from the sample without speech.

In Step S307, the speaker transform calculated in step S303 and the noise parameters calculated in Step S305 are employed to determine a "clean" speaker transform, that is, the speaker transform that would have been obtained if the received speech had been obtained under clean conditions. In an example of the invention, this step comprises mapping a "noisy" speaker transform to a "clean" speaker transform. This process will now be described in detail.

Figure 6:
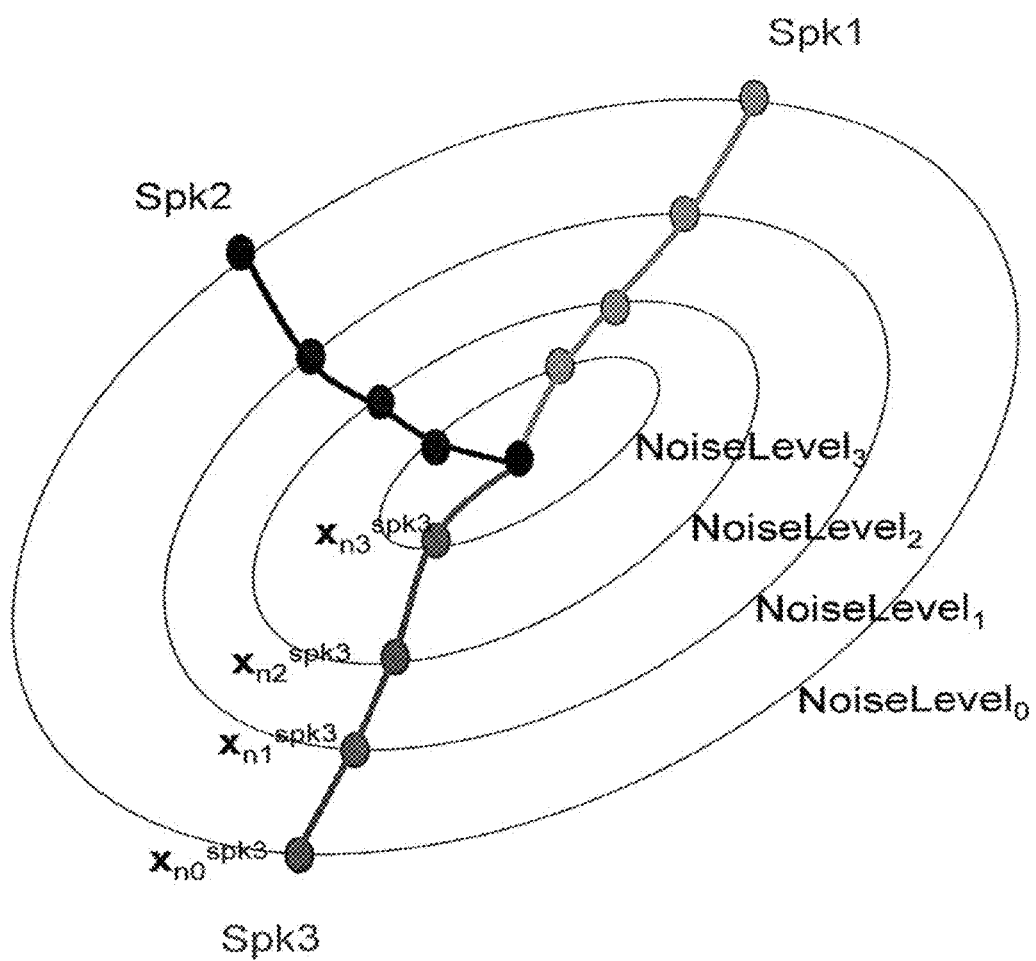
FIG. 6 is a schematic representation of the effect of noise levels on speaker parameters.

FIG. 6 is a schematic diagram of the speaker transform space according to an example of the invention. The effect of noise on speaker transform is indicated by contour lines. The position of the transforms corresponding to three speakers, Spk1, Spk2 and Spk 3, are indicated at four different noise levels, NoiseLevel$_0$, NoiseLevel$_1$, NoiseLevel$_2$ and NoiseLevel$_3$. The speaker transforms at NoiseLevel$_0$ are those obtained under clean conditions. The level of noise increases on going from NoiseLevel$_0$ to NoiseLevel$_3$. FIG. 6 shows that as the noise level increases, the difference between the transforms of different speaker decreases. At high enough levels of noise (i.e. the centre of the contour lines), there will be no difference in the speaker transform obtained from samples of speech from different speakers.

Figure 7:
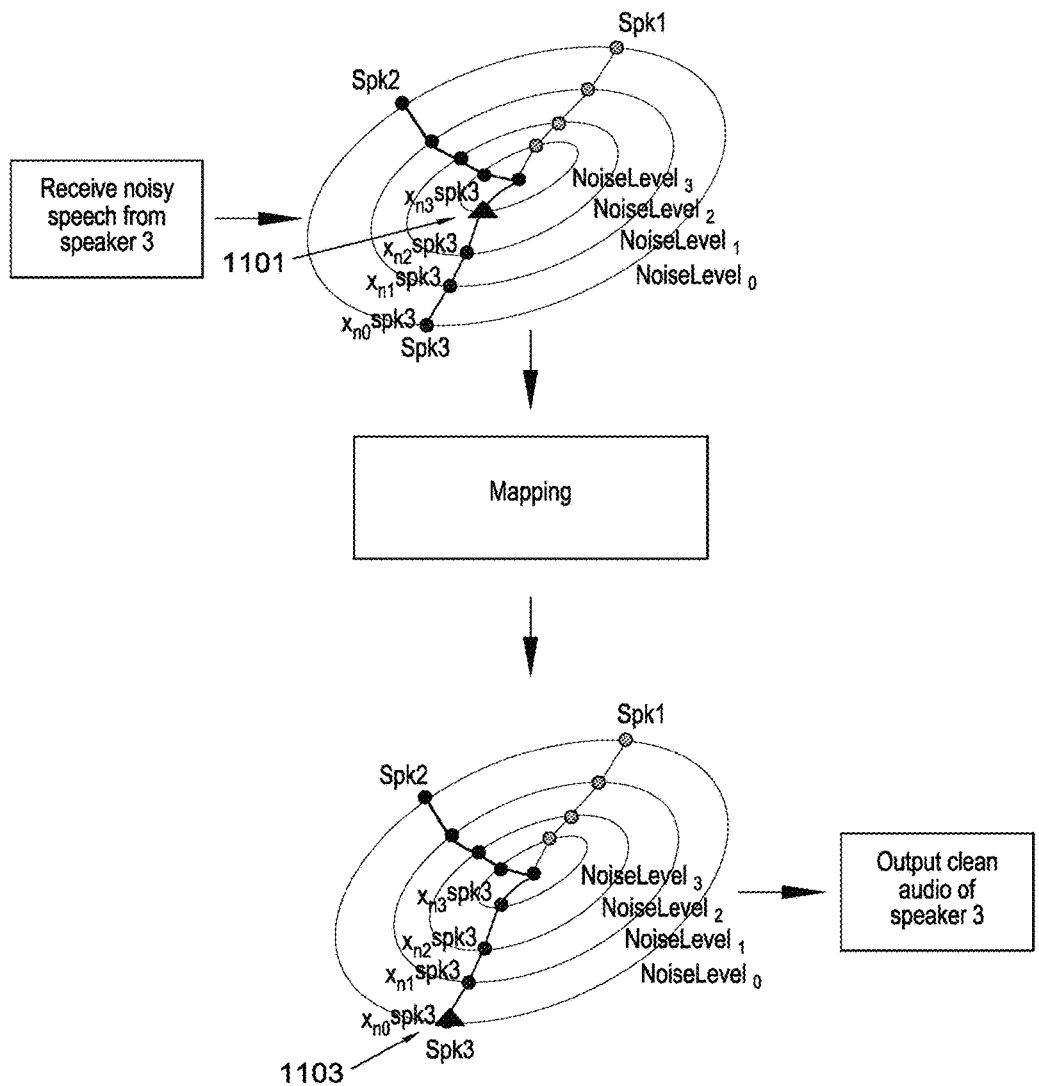
FIG. 7 is a schematic representation of mapping from noisy to clean speech parameters in accordance with an example of the invention.

In an example of the invention, obtaining a clean speaker transform comprises mapping a speaker transform obtained at one noise level to the speaker transform which would have been obtained at another noise level within the speaker space. This mapping is shown schematically in FIG. 7. A speaker transform is obtained from a sample of speech from speaker 3 at NoiseLevel$_3$. This is indicated by the solid triangle 1011 in FIG. 7. Using knowledge of the level of noise within the sample, the speaker transform is mapped from NoiseLevel$_3$ to NoiseLevel$_0$, i.e. to position 1103.

In an example of the invention, the mapping from noisy to clean space is performed using an adaptive model trained by a machine learning method, e.g. an artificial deep neural network (DNN). In an example of the invention, a deep neural network is employed to determine a function $f$ such that $$f(x_n^{spk}, y_n) = \hat{x}_o^{spk} \quad (21)$$

where $x_n^{spk}$ is the transform obtained under noise, $y_n$ is a vector that characterises the noise and $\hat{x}_o^{spk}$ is the transform which would be obtained without noise.

Figure 8:
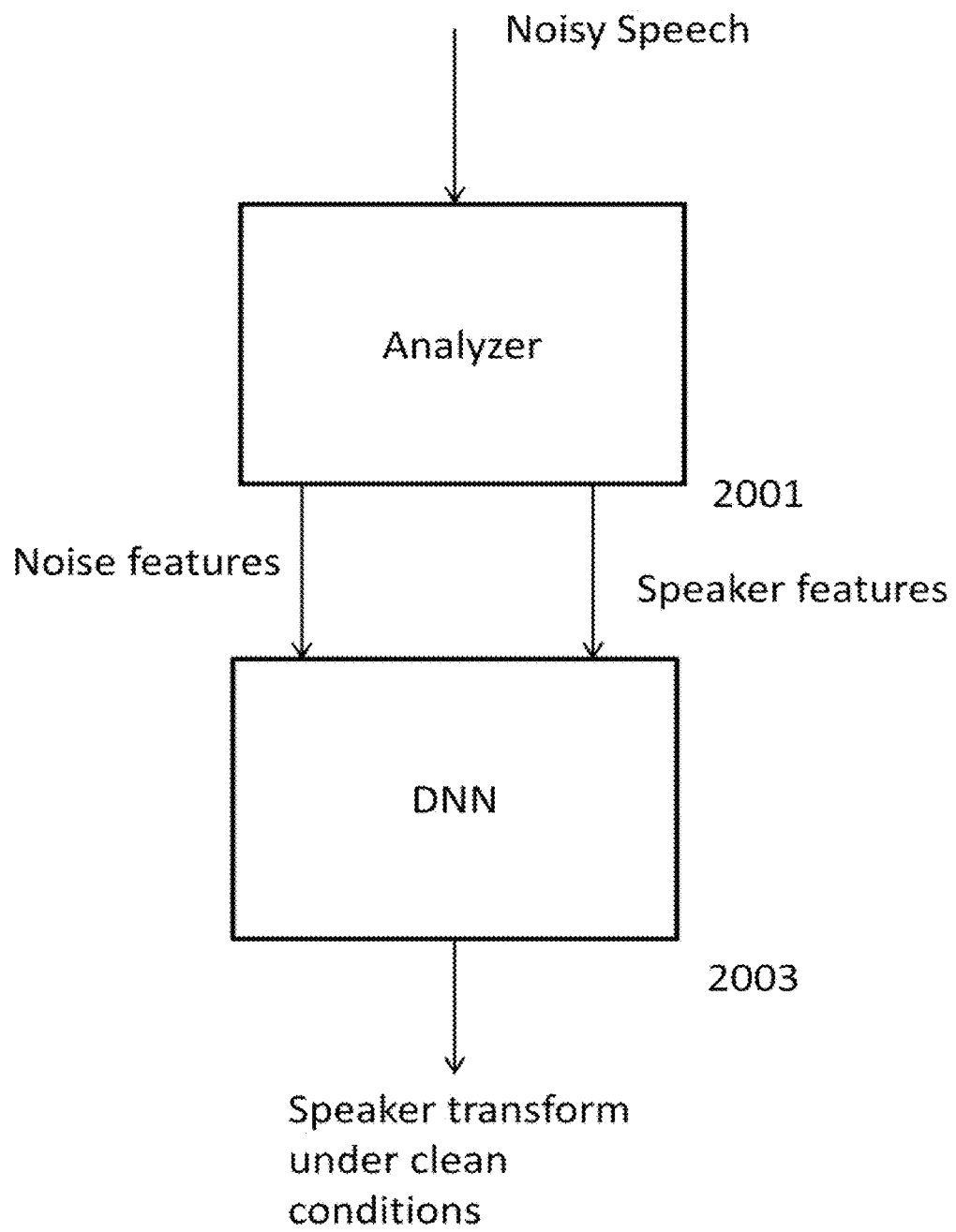
FIG. 8 is a schematic representation of a system for mapping noisy speech parameters to clean speech parameters in accordance with an example of the invention.

FIG. 8 shows a schematic of a system for performing the mapping. An analyser 2001 determines the speaker transforms from the noisy data. The analyser also determines the noise features of the noisy data. The analyser calculates the value of the speaker transform in the presence of noise, i.e. the position indicated by 1101 in FIG. 7 (the "speaker features"). The analyser also calculates the noise parameters characterizing noise in the speech. The skilled person will appreciate that the calculation of noise may be performed in a number of ways.

Both the speaker transforms and the noise features are input into the neural network 2003. The neural network maps the "noisy" speaker transforms to the clean speaker transforms using Equation (21). The clean speaker transform $\hat{x}_o^{spk}$ is then output to the acoustic model.

Finally, in step S309 of the method of FIG. 5, the clean speaker transform obtained in step S307 is employed to output audio using the process described above in relation to FIG. 2.

Figure 9:
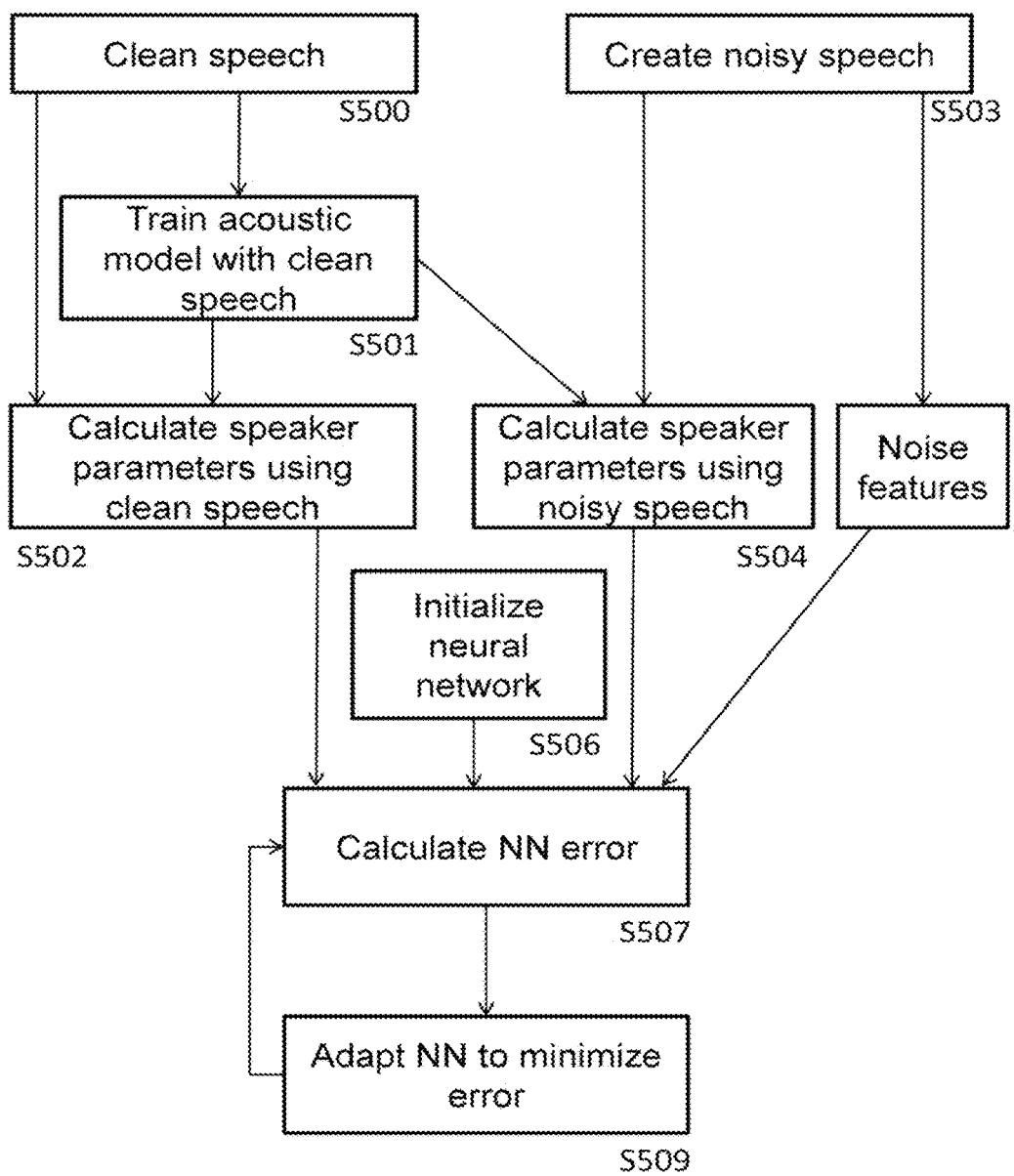
FIG. 9 is a flow diagram of neural network training in accordance with an example of the invention.

FIG. 9 shows a generalised process for training a neural network for use in an example of the invention. In this process, training data is employed to train the mapping. The training data can be created by adding different types of noise to existing clean data for a number of different speakers.

In Step S501, the acoustic model or models are trained with samples of clean speech for each of plurality of speakers ("training speakers"). The training of an acoustic model according to an example of the invention is described in Appendix 1.

Subsequently, the set of steps S502 to S504 is performed separately for each of the training speakers, thereby producing respective results for each training speaker.

In Step S502, for a given one of the training speakers, speaker parameters $\lambda^{(t)}$ for the clean speech training data for that training speaker are obtained.

In Step S503, noisy speech data η is created. In an example of the invention, this is done by adding different types of noise to some existing clean data for the training speaker.

In Step S504, adaptation parameters denoted as $\lambda_\eta^{(t)}$ are obtained for the created noisy data η using the process of adaptation described above.

In Step S505, the neural network is initialised. The skilled person will appreciate that a number of standard methods may be employed to initialise the neural network. In an example of the invention, random initialisation is employed.

Steps S506 and S507 are performed using the results obtained in steps S502 and S504 for all the training speakers. That is, the speaker parameters $\lambda^{(t)}$ and adaptation parameters $\lambda_\eta^{(t)}$ obtained in steps S502 and S504 for the respective multiple training speakers, are combined into a single dataset which is used in steps S506 and S507.

In Step S506, the neural network error is calculated. The noisy adaptation parameters $\lambda_\eta^{(t)}$, together with a vector of parameters to characterize the noise $\phi_n$ (noise features), are used as input for the DNN. The neural network then outputs "clean" speaker transforms $\bar{\lambda}_\eta^{(t)}$.

The output of the DNN will be a vector of adaptation parameters $\bar{\lambda}_\eta^{(t)}$, which should be as close as possible to the parameters $\lambda^{(t)}$ that were obtained when using the clean speech. The neural network error is calculated by comparing these two sets of parameters.

In an example of the invention, the neural network error function can be calculated as the difference between the predicted speaker transforms and the target coefficients, i.e. the root mean square error (RMSE):

$$E(\omega)_\eta^{RMSE} = -\frac{1}{2} \sum_{\eta,t} E(\omega)_{\eta,t}^{RMSE} = -\frac{1}{2} \sum_{\eta,t} \left( \lambda^{(t)} - \bar{\lambda}_\eta^{(t)} \right)^2 \quad (22)$$

where ω are the parameters of the deep neural network (DNN). The derivative of $E(\omega)_{\eta,t}^{RMSE}$ (the "back propagation error") is given by $$(\delta)_{\eta,t}^{RMSE} = (\lambda^{(t)} - \bar{\lambda}_\eta^{(t)}) \quad (23).$$

In another example of the invention, the error function is given by the log-likelihood over the clean training data, i.e.

$$E(w)^{ML} = \sum_{\eta,t} Q(\bar{\lambda}_\eta^{(t)}; \hat{\lambda}^{(t)}) \quad (24)$$

where the Auxiliary function $Q(\bar{\lambda}_\eta^{(t)}; \hat{\lambda}^{(t)})$ is computed over the clean data with the state occupancies $\gamma_m(\tau,t)$ obtained by using the clean transform $\lambda^{(t)}$. The derivative of $Q(\bar{\lambda}_\eta^{(t)}; \hat{\lambda}^{(t)})$ is given by Equations (50) and (60) in the Appendix for MLLR and CLLR respectively. In this example of the invention, the back propagation error can be expressed as $$\delta_{n,t}^{ML} = k^{(t)} - G^{(t)} \bar{\lambda}_\eta^{(t)} \quad (25)$$

where k and G are the sufficient statistics necessary to estimate the transformation parameters.

In step S507, the neural network is modified using stochastic gradient descent to reduce the error calculated in Step S506 above. In an example of the invention, this comprises varying the parameters ω until the back propagation error is zero. In other words, the DNN is trained, upon receiving noisy speech and parameters characterizing the noise, to produce an estimate of the parameters which would have been obtained by performing step S502 on the noisy speech if the noisy speech had not been corrupted by noise.

The process then moves back to step S506 and repeats until the NN error reaches convergence.

Thus, the parameters of the neural network are updated to learn the mapping from noisy speaker space to clean speaker space.

In an example of the invention, a noise feature vector that provides a good estimation of $\lambda_{n/s}$ and $\lambda_h$ is determined by the analyser 2001 for input into the DNN 2003.

Methods and systems according to the above examples of the invention can be applied to any adaptable acoustic model. Because the neural network is capable of pattern recognition, the relationship between the speaker transforms of a particular model and noise can be learnt by the network, regardless of the model employed. As shown in Appendix 2, when an MLLR (or CAT) model is employed, the function ƒ of Equation (21) is given by Equation (71).

Methods and systems according to the examples of the invention described above enable speech to be synthesised in a target voice without the need for high quality, low noise samples of speech in that voice. Instead, samples of the target voice may be provided without the use of a studio or high quality equipment. Speaker similarity is preserved without the use of signal processing to compensate or clean the noise.

While certain arrangements have been described, these arrangements have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made.

Appendix 1

In speech processing systems which are based on Hidden Markov Models (HMMs), the HMM is often expressed as:

$$M = (A, B, \Pi) \quad (38)$$

where $A = \{a_{ij}\}_{i,j=1}^{N}$ and is the state transition probability distribution, $B = \{b_j(o)\}_{j=1}^{N}$ is the state output probability distribution and $\Pi = \{\pi_i\}_{i=1}^{N}$ is the initial state probability distribution and where N is the number of states in the HMM.

In the examples of the invention described below, the state transition probability distribution A and the initial state probability distribution are determined in accordance with procedures well known in the art. Therefore, this section will be concerned with the state output probability distribution.

The aim when training a conventional text-to-speech system is to estimate the model parameter set which maximises likelihood for a given observation sequence. The same system as that shown in FIG. 1 may be used for training an acoustic model for use in a text-to-speech system. However, when training an acoustic model, it is necessary to have an audio input which matches the text being input via text input 15. Training the model therefore comprises maximising the model parameter set which maximises the likelihood of the audio input.

Generally in text to speech systems the state output vector or speech vector o(t) from an $m^{th}$ Gaussian component in a model set M is $$p(o_t|m,M) = N(o_t; \mu_m, \Sigma_m) \quad (39)$$

where $\mu_m$ and $\Sigma_m$ are the mean and covariance of the $m^{th}$ Gaussian component.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(\mathcal{M}, \mathcal{M}') = \sum_{m,t} \gamma_m(t) \log p(o(t), m | \mathcal{M}) \quad (40)$$

where $\gamma_m(t)$ is the posterior probability of component m generating the observation o(t) given the current model parameters M' and M is the new parameter set. After each iteration, the parameter set M' is replaced by the new parameter set M which maximises Q(M, M'). p(o(t), m|M) is a generative model such as a GMM, HMM etc.

The model may incorporate factors of speech data such as speaker, expression, or noise environment, or some other factor of speech data. The model then has a state output vector of:

$$p(o(\tau)|m,t,M) = N(o_t; \hat{\mu}_m, \hat{\Sigma}_m) \quad (41)$$

where m∈{1, ..., MN}, τ and t are indices for component, time and target speaker, or expression or some other factor of speech data respectively and where MN, T and S are the total number of components, frames and speakers (or expression, or noise environment, or some other factor of speech data) respectively. In the discussion below, it is assumed the speech factor is speaker.

The exact form of $\hat{\mu}_m$ and $\hat{\Sigma}_m^{(t)}$ will depend on any speaker dependent transforms that are applied. Three approaches to such speaker dependent transformations are discussed below. However, others are also possible.

MLLR

When employing a Maximum-likelihood linear regression (MLLR) transform, the goal is to find an affine transformation of the canonical parameters that maximises the probability with respect to the adaptation data $c^{(t)}$ of a target speaker t. This transformation is independent for the mean and the covariances of the model. Considering only the effect on the mean, the MLLR mean transformation can be written as $$\mu_m^{(t)} = A_{q(m)}^{(t)} \mu_m + b_{q(m)}^{(t)} \quad (42)$$

where $\{A_{q(m)}^{(t)}, b_{q(m)}^{(t)}\}$ represents the affine transformation which is applied to the mean vector of the Gaussian component m for regression class q(m). This can be expressed in a more compact form as $$\mu_m^{(t)} = A_{q(m)}^{+(t)} \mu_m^{+} \quad (43)$$

where $A_{q(m)}^{+(t)} = [A_{q(m)}^{(t)}; b_{q(m)}^{(t)}]$ and $\mu_m^{+} = [\mu^*, 1]^*$.

Each dimension d in $\mu_m^{(t)}$ can be also represented as $$\mu_m^{(t)}[d] = A_{q(m)}^{+(t)}[d]\mu_m^+ \quad (44)$$
$$= \mu_m^{+}(A_{q(m)}^{+(t)}[d])^{\cdot}$$

where $A_{q(m)}^{+(t)}[d]$ is the $d^{th}$ line of the $A_{q(m)}^{+(t)}$ matrix which can be also expressed as $$A_{q(m)}^{+(t)}[d] = K_{q(m,d)}\lambda^{(t)} \quad (45)$$

Where $\lambda^{(t)}$ is a supervector with all the adaptation parameters and $K_{q(m,d)}$ is a selection matrix for the Gaussian M and dimension d.

Now, Equation (43) can be rewritten as $$\mu_m^{(t)} = M_{q(m)}\lambda^{(t)} \quad (46)$$

where $M_{q(m)}$ is a matrix which lines are defined as $$M_{q(m)}[d] = \mu_m^{+*}K_{q(m,d)} \quad (47)$$

The adaptation coefficients are obtained by maximising the auxiliary function $$Q(\lambda^{(t)}; \lambda^{(t)}) = \quad (48)$$
$$-\frac{1}{2}\sum_{m,\tau \in t}\gamma_m(\tau,t) \times \left\{ (o(\tau)-\mu_m^{(t)})^{\cdot}\sum_{v(m)}^{-1}(o(\tau)-\mu_m^{(t)}) + \log\left|\sum_{v(m)}\right|\right\} + C$$

where $\Sigma_{v(m)}$ is the covariance of component m and 0 is an observation vector which is usually built by joining the static and dynamic spectral coefficients, e.g., $$o = [c_o^{\cdot}, \Delta c_o^{\cdot}, \Delta^2 c_o^{\cdot}]^{\cdot} \quad (49)$$

The $\Delta$ and $\Delta^2$ are usually linear operators that can be summarized as o=Wc with W a fixed matrix.

The derivative of (48) with respect to $\lambda^{(t)}$ is $$\frac{\partial Q(\lambda^{(t)}; \lambda^{(t)})}{\partial \lambda^{(t)}} \propto k^{(t)} - G^{(t)}\lambda^{(t)} \quad (50)$$

where $$k^{(t)} = \sum_{\tau \in t}^{m,\tau} \gamma_m(\tau,t)M_{q(m)}^{\cdot}\sum_{v(m)}^{-1} o(\tau)$$

$$G^{(t)} = \left(\sum_{\tau \in t}^{m,\tau}\gamma_m(\tau,t)M_{q(m)}^{\cdot}\sum_{v(m)}^{-1}M_{q(m)}\right) \quad (51)$$

which equating Equation (50) to zero yields the solution $$\lambda^{(t)} = (G^{(t)})^{-1}k^{(t)}$$

CAT

Cluster adaptive training (CAT) is a special case of MLLR in which different speakers are accommodated by applying weights to model parameters which have been arranged into clusters. In this model the mean value is defined as $$\mu_m^{(s)} = \sum_{\forall i \in \{1,\ldots P\}} \mu_{c(m,i)}\lambda_{i,q(m)}^{(s)} \quad (52)$$

where P is the total number of clusters.

Consequently, all the Equations described above in relation to MLLR apply equally to CAT, with $M_{q(m)}$ substituted by $$M_{q(m)}^{CAT} = [\mu_{c(m,1)}, \ldots, \mu_{c(m,P)}] \quad (53)$$

CMLLR

When using a constrained maximum-likelihood linear regression (CMLLR) transform, the transformation is applied in the feature space. The goal of the adaptation is to find an affine transformation of the observed feature vector that maximizes the probability with respect to a model trained on a canonical space. The state output vector is given by:

$$P(o(\tau)|m,t,M) = N(A'_{q(m)}{}^{(t)}o(\tau) + b'_{q(m)}{}^{(t)}; \mu_m, \Sigma_m) \quad (54)$$

Similarly to MLLR, the CMLLR transform can be expressed as $$o(\tau)_{q(m)}{}^{(t)} = (A'_{q(m)}{}^{(t)}o(\tau) + b'_{q(m)}{}^{(t)}) = (A_{q(m)}^{+(t)}o(\tau)^+) \quad (55)$$

with $$A'_{q(m)}{}^{(t)} = [A'_{q(m)}{}^{(t)}; b'_{q(m)}{}^{(t)}]o(\tau)^+ = [o(\tau)^{\cdot}, 1]^{\cdot} \quad (56)$$

As in Equation (44), each dimension of $o(\tau)_{q(m)}{}^{(t)}$ can be expressed as $$o(\tau)_{q(m)}^{(t)}[d] = A_{q(m)}^{+\prime(t)}[d]o(\tau)^+ \quad (57)$$
$$= o(\tau)^{+\cdot}(A_{q(m)}^{+\prime(t)}[d])^{\cdot}$$

Therefore, as with MLLR this can be written as $$A_{q(m)}^{+\prime(t)}o(\tau) = O_{q(m)}(\tau)\lambda^{\prime(t)} \quad (58)$$

where $\lambda^{\prime(t)}$ is the supervector with all the CMLLR coefficients and $O_{q(m)}$ a matrix with lines given by $$O_{q(m),d}(\tau) = o(\tau)^{+\cdot}K'_{q(m,d)} \quad (59)$$

with $K'_{q(m,d)}$ the selection matrix for CMLLR.

The derivative of $Q(\lambda^{\prime(t)}; \lambda^{\prime(t)})$ w.r.t. $\lambda^{\prime(t)}$ can again be expressed as $$\frac{\partial Q(\lambda^{\prime(t)}; \lambda^{\prime(t)})}{\partial \lambda^{\prime(t)}} \propto k^{\prime(t)} - G^{\prime(t)}\lambda^{\prime(t)} \quad (60)$$

where now $$k^{\prime(t)} = \sum_{\tau \in t}^{m,\tau}\gamma_m(\tau,t)O_{q(m)}(\tau)^{\cdot}\sum_{v(m)}^{-1}\mu_m \quad (61)$$

$$G^{\prime(t)} = \sum_{\tau \in t}^{m,\tau}\gamma_m(\tau,t)O_{q(m)}(\tau)^{\cdot}\sum_{v(m)}^{-1}O_{q(m)}(\tau)$$

which yields the solution $$\lambda^{\prime(t)} = (G^{\prime(t)})^{-1}k^{\prime(t)}. \quad (62)$$

Appendix 2

The effect of noise on transforms according to the acoustic models discussed in Appendix 1 will now be described.

In an example of the invention, the acoustic model employed is a Maximum-likelihood Linear regression model (MLLR). For MLLR, it follows from Equations (15) and (49) (see Appendix 1) that $$o = o_s + 0.5o_{n/s} + o_h \quad (63)$$

Substituting in (51) gives $$k_s^{(t)} = \sum_{\tau \in t}^{m,\tau} \gamma_m(\mathcal{T}, t) M_{q(m)}^T \sum_{v(m)}^{-1} O_s(\mathcal{T}) \qquad (64)$$

$$k_{n/s}^{(t)} = \sum_{\tau \in t}^{m,\tau} \gamma_m(\mathcal{T}, t) M_{q(m)}^T \sum_{v(m)}^{-1} O_{n/s}(\mathcal{T}) \qquad (65)$$

$$k_h^{(t)} = \sum_{\tau \in t}^{m,\tau} \gamma_m(\mathcal{T}, t) M_{q(m)}^T \sum_{v(m)}^{-1} O_h(\mathcal{T}) \qquad (66)$$

and consequently $$\lambda^{(t)} = \lambda_s^{(t)} + 0.5\lambda_{n/s}^{(t)} + \lambda_h^{(t)} \qquad (67)$$

where $$\lambda_s^{(t)} = (G^{(t)})^{-1} k_s^{(t)} \qquad (68)$$

$$\lambda_{n/s}^{(t)} = (G^{(t)})^{-1} k_{n/s}^{(t)} \qquad (69)$$

$$\lambda_h^{(t)} = (G^{(t)})^{-1} k_h^{(t)} \qquad (70)$$

In other words, the effect of additive and convolutional noise in an MLLR transform is to add a bias to that transform, which depends in a non-linear way on the noise-to-signal ratio.

From the above, it can be seen that in the case of MLLR, the function $f$ in Equation (21) is therefore given (from Equation (67)) as $$\hat{\lambda}_s^{(t)} = \hat{\lambda}_o^{(t)} - 0.5\hat{\lambda}_{n/s}^{(t)} - \hat{\lambda}_h^{(t)} \qquad (71)$$

with $$y_n = -0.5\hat{\lambda}_{n/s}^{(t)} - \hat{\lambda}_h(t). \qquad (72)$$

In another example of the invention, a CAT acoustic model is employed. The main difference between CAT and general MLLR is that due to its simplicity, CAT models trained on clean speech are strictly constrained to a space of clean speech. As a result, if $o_{n/s}$ or $o_h$ are orthogonal to clean speech, their projection into that space will be zero, i.e. $\lambda_{n/s}^{CAT} = \lambda_h^{CAT} = 0$.

In yet another example of the invention, a CMLLR acoustic model is employed. In CMLLR, from Equations (63) and (59)

$$O_{q(m)}(\tau) = O_{s,q(m)}(\tau) + 0.5 O_{n/s,q(m)}(\tau) + O_{h,q(m)}(\tau) \qquad (73)$$

The noisy terms in the CMLLR case are now both in the numerator and the denominator of Equation(62). The relationship between the noisy and the clean transform is therefore much more complex than for MLLR.

The invention claimed is:

1. A method of adapting an acoustic model relating acoustic units to speech vectors, wherein said acoustic model comprises a set of acoustic model parameters related to a given speech factor and which enable the acoustic model to output speech vectors with different values of the speech factor,
the method comprising:
inputting a sample of speech with a first value of the speech factor;
determining values of the set of acoustic model parameters which enable the acoustic model to output speech with said first value of the speech factor; and
employing said determined values of the set of acoustic model parameters in said acoustic model,
wherein said sample of speech is corrupted by noise, and wherein said step of determining the values of the set of acoustic model parameters comprises:
(i) obtaining noise characterization parameters characterising the noise;
(ii) performing an acoustic model parameter generation algorithm on the sample of speech, thereby generating corrupted values of the set of acoustic model parameters;
(iii) using the noise characterization parameters to map said corrupted values of the set of acoustic model parameters to clean values of the set of acoustic model parameters, wherein the clean values of the set of acoustic model parameters are estimates of the acoustic model parameters which would be obtained by performing the acoustic model parameter generation algorithm on the sample of speech if the sample of speech were not corrupted by the noise; and
(iv) employing said clean values of the set of acoustic model parameters as said determined values of the set of acoustic model parameters.

2. The method of claim 1, wherein the speech factor is speaker voice.

3. The method of claim 1, wherein said mapping is performed by an adaptive model trained using a machine learning algorithm.

4. The method of claim 3 further wherein said adaptive model was trained by iteratively adjusting weight values of the adaptive model to minimise a measure of the difference between (a) the values of the set of acoustic model parameters without noise corruption, and (b) the output of the adaptive model when the set of acoustic model parameters corrupted by noise and the information regarding the noise corruption are input to the adaptive model.

5. The method of claim 3, wherein the adaptive model is a deep neural network.

6. The method of claim 1, wherein said acoustic model parameters comprise parameters of Maximum Likelihood Linear Regression transforms.

7. The method of claim 1, wherein said acoustic model parameters comprise Cluster Adaptive Training weights.

8. The method of claim 1, wherein said acoustic model parameters comprise parameters of Constrained Maximum Likelihood Linear Regression transforms.

9. A method of claim 1 further comprising:
inputting text;
dividing said input text into a sequence of acoustic units;
converting said sequence of acoustic units to a sequence of speech vectors using said adapted acoustic model; and
outputting said sequence of speech vectors as audio with said first value of the speech factor.

10. A method of claim 1, the method further comprising:
(i) receiving training data, said training data comprising:
values of a set of acoustic model parameters corrupted by noise,
values of the same set of acoustic model parameters without noise corruption, and data values characterizing the noise;
(ii) training a deep neural network by iteratively adjusting weight values of the deep neural network to minimise a measure of the difference between (a) the values of the set of acoustic model parameters without noise corruption, and (b) the output of the deep neural network when the set of acoustic model parameters corrupted by noise and the data values characterizing the noise are input to the deep neural network;
wherein said mapping is performed by said trained deep neural network.

11. A method according to claim 10 in which said measure is inversely related to the log likelihood of the set of acoustic model parameters without noise corruption being obtained as the output of the deep neural network.

12. A method according to claim 10 in which said measure is a root mean squared difference between the set of acoustic model parameters without noise corruption and the output of the deep neural network.

13. Apparatus for adapting an acoustic model relating acoustic units to speech vectors, wherein said acoustic model comprises a set of acoustic model parameters related to a given speech factor and which enable the acoustic model to output speech vectors with different values of the speech factor,
the system comprising:
a receiver for receiving a sample of speech with a first value of the speech factor; and
a processor configured to:
(a) determine values of the set of acoustic model parameters which enable the acoustic model to output speech with said first value of the speech factor; and
(b) employ said determined values of the set of acoustic model parameters in said acoustic model,
wherein said sample of speech is corrupted by noise, and
wherein said determination of the values of the set of acoustic model parameters comprises:
(i) obtaining noise characterization parameters characterising the noise with which the sample of speech is corrupted;
(ii) performing an acoustic model parameter generation algorithm on the sample of speech, thereby generating corrupted values of the set of acoustic model parameters;
using the noise characterisation parameters to map said corrupted values of the set of acoustic model parameters to clean values of the set of acoustic model parameters, wherein the clean values of the set of acoustic model parameters are estimates of the acoustic model parameters which would be obtained by performing the acoustic model parameter generation algorithm on the sample of speech if the sample of speech were not corrupted by the noise.

14. An apparatus according to claim 13, further comprising:
a receiver for receiving input text; and
an output;

the processor being further configured to:
(i) divide said input text into a sequence of acoustic units; and
(ii) convert said sequence of acoustic units to a sequence of speech vectors using said adapted acoustic model; and
the output being configured to output said sequence of speech vectors as audio with said first value of the speech factor.

15. A tangible, non-transitory carrier medium storing, in non-transitory form, computer readable code configured when performed by a processor of a computer to cause the processor to adapt an acoustic model relating acoustic units to speech vectors, wherein said acoustic model comprises a set of acoustic model parameters related to a given speech factor and which enable the acoustic model to output speech vectors with different values of the speech factor,
the computer readable code being operative to cause the processor to:
input a sample of speech with a first value of the speech factor;
determine values of the set of acoustic model parameters which enable the acoustic model to output speech with said first value of the speech factor;
and
employ said determined values of the set of acoustic model parameters in said acoustic model,
wherein said sample of speech is corrupted by noise, and
wherein said determination of the values of the set of acoustic model parameters comprises:
(i) obtaining noise characterization parameters characterising the noise;
performing an acoustic model parameter generation algorithm on the sample of speech, thereby generating corrupted values of the set of acoustic model parameters;
(iii) using the noise characterization parameters to map said corrupted values of the set of acoustic model parameters to clean values of the set of acoustic model parameters, wherein the clean values of the set of acoustic model parameters are estimates of the acoustic model parameters which would be obtained by performing the acoustic model parameter generation algorithm on the sample of speech if the sample of speech were not corrupted by the noise; and
(iv) employing said clean values of the set of acoustic model parameters as said determined values of the set of acoustic model parameters.

* * * * *